(12) United States Patent
Latein et al.

(10) Patent No.: US 10,634,430 B2
(45) Date of Patent: Apr. 28, 2020

(54) CONTINUOUS-FLOW DRYER COMPRISING A HEAT EXCHANGER

(71) Applicant: STELA Laxhuber GmbH, Massing (DE)

(72) Inventors: Tobias Latein, Erlbach (DE); Thomas Christian Laxhuber, Massing (DE)

(73) Assignee: STELA Laxhuber GmbH, Massing (DE)

(*) Notice: Subject to any disclaimer, the term of this patent is extended or adjusted under 35 U.S.C. 154(b) by 98 days.

(21) Appl. No.: 15/960,628

(22) Filed: Apr. 24, 2018

(65) Prior Publication Data

US 2018/0306508 A1  Oct. 25, 2018

(30) Foreign Application Priority Data

Apr. 24, 2017 (DE) .......... 10 2017 108 699

(51) Int. Cl.
| | | |
|---|---|---|
| *F26B 3/00* | (2006.01) | |
| *F26B 23/00* | (2006.01) | |
| *F26B 21/06* | (2006.01) | |
| *F26B 3/04* | (2006.01) | |
| *F26B 17/04* | (2006.01) | |
| *F26B 21/00* | (2006.01) | |
| *F26B 21/04* | (2006.01) | |

(Continued)

(52) U.S. Cl.
CPC .............. *F26B 23/002* (2013.01); *F26B 3/04* (2013.01); *F26B 17/04* (2013.01); *F26B 21/001* (2013.01); *F26B 21/04* (2013.01); *F26B 21/06* (2013.01); *F26B 23/02* (2013.01); *F26B 25/14* (2013.01); *Y02P 70/405* (2015.11)

(58) Field of Classification Search
CPC ........ F26B 23/002; F26B 23/02; F26B 17/04; F26B 21/001; F26B 21/04; F26B 21/06; F26B 25/14; F26B 3/04; Y02P 70/405; F28F 17/005; F28F 2210/02; F28F 2265/06; F28F 2265/18
USPC ......... 34/467, 443, 474, 475, 487, 493, 507, 34/510, 236, 218–220, 86, 72, 209, 210
See application file for complete search history.

(56) References Cited

U.S. PATENT DOCUMENTS

| 2,722,752 | A | * | 11/1955 | Morch | ................... | F26B 15/12 |
| | | | | | | 34/86 |
| 4,255,870 | A | * | 3/1981 | Malmquist | .............. | F26B 21/04 |
| | | | | | | 34/212 |
| 2015/0096191 | A1 | * | 4/2015 | Jung | ..................... | D06F 58/206 |
| | | | | | | 34/493 |

FOREIGN PATENT DOCUMENTS

| DE | 2719670 C2 | 9/1984 |
| WO | 2012075518 A1 | 6/2012 |

(Continued)

OTHER PUBLICATIONS

European Patent Office, Search Report in parallel application EP 18 16 8868, dated Aug. 22, 2018.

*Primary Examiner* — John P McCormack
(74) *Attorney, Agent, or Firm* — Smartpat PLC

(57) ABSTRACT

A continuous-flow dryer for drying a material by means of hot air is provided with a fresh air supply device for supplying fresh air as supply air, an exhaust air recirculation device for removing exhaust air and for recirculating exhaust air as supply air, and a heat exchanger, through which fresh air on the one hand and exhaust air on the other hand are led, for transferring waste heat of the exhaust air into the fresh air. According to the invention, the removed exhaust air is supplied at the bottom into the heat exchanger.

8 Claims, 1 Drawing Sheet

(51) Int. Cl.
*F26B 23/02* (2006.01)
*F26B 25/14* (2006.01)

(56) References Cited

FOREIGN PATENT DOCUMENTS

WO     2014168559 A1    10/2014
WO     2015127490 A1    9/2015

\* cited by examiner

CONTINUOUS-FLOW DRYER COMPRISING A HEAT EXCHANGER

TECHNICAL FIELD

The invention relates to a continuous-flow dryer for drying a material by means of hot air, comprising a fresh air supply device for supplying fresh air as supply air, an exhaust air recirculation device for removing exhaust air and recirculating it as supply air and a heat exchanger, through which fresh air on the one hand and exhaust air on the other hand are led, for transferring waste heat of the exhaust air into the fresh air.

BACKGROUND

Continuous-flow dryers are dryers, in which material to be dried is transported continuously or in batches through the dryer. Such a dryer is in particular a belt dryer which conveys the material to be dried through the continuous-flow dryer by means of a belt. The material to be dried, for example sewage sludge, wood chips, hogged wood, RDF (refuse-derived fuel), SSW (solid shredded waste), MSW (municipal solid waste), household waste, grass or agricultural products and by-products such as sugar beet pulp, is here at first damp or wet. The material is dried by moisture being removed from it by means of hot air. The hot air is separately produced by heating in particular air from the surroundings of the continuous-flow dryer. On heating the air, the relative air moisture of this air decreases, the air becomes "drier". This hot air with low relative air moisture then flows through and around the constituents to be dried in the continuous-flow dryer.

For heating the air to hot air, energy is of course needed. This energy is lost when the hot air generated is discharged into the surroundings after the drying of the material. First steps for circulating the hot air are therefore known.

The material to be dried is at the same time conveyed in a transport direction through the continuous-flow dryer and in so doing preferably runs through a plurality of sections. The individual section divides the continuous-flow dryer spatially. The sections can for this purpose be largely separated from one another in terms of air flow. Different air flows are thus possible in the sections, which can each have different relative air mixtures and different temperatures.

For supplying air to the continuous-flow dryer a fresh air supply device is provided, which supplies generally dry fresh air, removed from the surroundings, to the continuous-flow dryer as supply air.

In the case of such continuous-flow dryers it is further known to provide an exhaust air recirculation device, by means of which exhaust air is removed from the drying process and then at least partly recirculated into the continuous-flow dryer. In so doing, part of the exhaust air is led through a heat exchanger, through which also supplied fresh air is led. Thus, thermal energy or waste heat from the exhaust air can be transferred to the supply air.

SUMMARY

The object on which the invention is based is to provide a continuous-flow dryer for drying a material by means of hot air which makes possible a further energy saving compared with known continuous-flow dryers.

This object is achieved according to the invention with a continuous-flow dryer for drying a material by means of hot air, comprising a fresh air supply device for supplying fresh air as supply air, an exhaust air recirculation device for removing exhaust air and for recirculating exhaust air as supply air, and a heat exchanger, through which fresh air on the one hand and exhaust air on the other hand are led, for transferring waste heat of the exhaust air into the fresh air. According to the invention, the removed exhaust air is supplied at the bottom into the heat exchanger.

The solution according to the invention entails the advantage that the exhaust air flowing into the heat exchanger firstly flows from the bottom upwards and in so doing moves opposite the direction of gravity. The exhaust air therefore flows upwards, whereas gravity acts downwards. The gravity acts on dust particles which are situated in the exhaust air and in particular come from the previously dried material. These dust particles are, with the solution according to the invention, which has surprisingly been shown, deposited in a particularly large extent and can thus be removed from the heat exchanger without dirtying or sooting the latter. The solution according to the invention thus improves the self-cleaning of the heat exchanger.

The two flows of exhaust air and supply air are preferably separated from one another at the heat exchanger by means of a separating surface. At the separating surface, on one side the exhaust air and on the other side the supply air then flow along. Heat energy of the exhaust air is discharged to the supply air through the separating surface. The waste heat of the exhaust air thus heats the air supplied to the continuous-flow dryer, which in particular is fresh air. Thus, heat energy from the exhaust air is recovered. At the same time, the air flows of exhaust air and supply air are separated from one another in terms of moisture. The moisture contained in the exhaust air cannot therefore pass over into the supply air.

Advantageously, the heat exchanger according to the invention is dimensioned such that moisture condenses out on it from the exhaust air. Moisture condenses out when the relative air moisture of the respectively relevant air has reached 100% (in words: one hundred percent). The relative air moisture in air increases when the air, as in this case the hot exhaust air, cools. On the other hand, the relative air moisture decreases when the air is heated. These physical effects of the increase and decrease of the air moisture are shown in the Mollier h,x-diagram. The condensing-out sought according to the invention preferably takes place at the separating surface of the heat exchanger. For this the exhaust air releases so much thermal energy to the separating surface that the relative air moisture in the exhaust air reaches 100% (in words: one hundred percent). The first heat exchanger according to the invention thus advantageously has three functions. The first function is the dehumidifying of the exhaust air which flows through the first heat exchanger. The second function is the heating of the supplied fresh air. The third function is the reducing of relative air moisture of the supplied fresh air, caused by the heating of this fresh air.

With the condensing-out and the manner, according to the invention, of supplying the exhaust air from the bottom into the heat exchanger, the above-mentioned self-cleaning of the heat exchanger is, moreover, improved. This is because the condensed-out water forms, at the separating surface of the heat exchanger, a fluid flow which washes off advantageously downwards the dust accumulating there. This effect is particularly high precisely when the exhaust air is led downwards and therefore the dust freshly introduced into the heat exchanger is washed off immediately by condensation water flowing off downwards. Subsequently the exhaust air is then largely free from dust and its remaining path through the heat exchanger leads to no greater risk of dirtying or sooting.

Such a through-flowing of the heat exchanger according to the invention proves particularly effective when the removed exhaust air is removed at the bottom from the heat exchanger. The exhaust air then flows in at least two portions through the heat exchanger, in particular U-shaped from the bottom upwards and again from the top downwards. In doing so, in the first portion on the outward path large dust particles are separated from the exhaust air. In the second portion on the return path small dust particles are advantageously entrained by the exhaust air. These are thus likewise discharged from the heat exchanger and do not dirty or soot the latter.

The heat exchanger according to the invention is preferably further designed with two portions, through which on the one hand the fresh air is to flow successively and through which on the other hand the exhaust air is to flow successively. The two portions are thus connected in series, both as regards the fresh air and as regards the exhaust air. In this case, preferably, firstly the exhaust air is to flow through a first portion and secondly the fresh air is to flow through, whereas the exhaust air is to flow through the second portion secondly and the fresh air is to flow through firstly. With such a connection arrangement, in the first portion cold, not preheated, fresh air encounters already cooled exhaust air, whereas in the second portion already preheated fresh air encounters not yet cooled, hot exhaust air. Consequently, overall the fresh air in the second portion can be comparatively highly heated up and the exhaust air in the first portion can have a comparatively large amount of heat withdrawn from it.

Preferably, furthermore a first and a second section are provided, through which the material is passed successively in a transport direction, the fresh air supply device being designed for supplying fresh air as supply air into the first section, and the exhaust air recirculation device for removing exhaust air from the second section and for recirculating it as supply air back into the second section. With such a division of sections the exhaust air of one section of the continuous-flow dryer is withdrawn, in which this exhaust air is highly saturated with moisture but still comparatively not very hot. With such exhaust air the aforementioned condensation effect and resulting withdrawal of heat due to phase transformation can be particularly highly utilized.

Alternatively, advantageously a first and a second section are provided, through which the material is passed successively in a transport direction, the fresh air supply device being designed for supplying fresh air as supply air into the second section, and the exhaust air recirculation device being designed for removing exhaust air from the first section and for recirculating it as supply air back into the first section. The exhaust air is then withdrawn from a rear part of the continuous-flow dryer, in which this exhaust air is not necessarily completely saturated but in any case is comparatively hot. With such exhaust air, fresh air can be preheated to a relatively high temperature.

On the continuous-flow dryer according to the invention further advantageously a heater is provided, by means of which the fresh air is to be heated up before being supplied as supply air. The supplied fresh air can thus be precisely regulated to the desired drying temperature.

Furthermore a heater is preferably provided on the continuous-flow dryer according to the invention, by means of which the exhaust air led through the heat exchanger is to be heated up before being supplied as supply air. Thus the recirculated exhaust air can also be improved with regard to its relative air moisture and processed before it is recirculated into the respective section of the continuous-flow dryer again.

Advantageously, in at least one of the sections, there is further provided an exhaust air sensor by means of which in the exhaust air its moisture is to be determined. Such an air sensor determines in particular the relative air moisture and/or the temperature of the air flowing against or around it. Advantageously, the relative air moisture of the exhaust air is thus to be determined by means of the exhaust air sensor. When the relative air moisture of the exhaust air is known, it is possible by means of a control to define whether this exhaust air is to be dehumidified or whether this air is to be supplied directly to the respective section or the respective region again.

Alternatively or additionally, a supply air sensor is further provided, by means of which in the supply air its moisture is to be determined. The supply air sensor determines the relative air moisture of the flowing-against supply air. It is thus advantageous to determine the relative air moisture with which the supply air flows into the respective section. It is thus particularly advantageous also to determine whether and by how many degrees Celsius the supply air is to be additionally heated by a heater to achieve a desired relative air moisture in the supply air.

In a preferred manner, for transporting the material through the continuous-flow dryer two belts are further provided, which are assigned in particular to the first section and the second section. Such a two-part belt in a continuous-flow dryer makes it possible for each of the two sections to have their own belt. Thus, the two sections can also be arranged spatially separated from each other, in particular above each other.

Further, preferably also a regulating device is provided, by means of which the moisture in the exhaust air is to be measured and an air guide in the exhaust air recirculation device, in the first heat exchanger and/or in the second heat exchanger is to be regulated. A regulating device or control evaluates inputs of the regulating device and regulates or controls by means of logic of the regulating device its outputs. Electrical signals of sensors of different type, such as for example a temperature sensor or a moisture sensor, serve as inputs here. Mostly switches or electrical signals, for example for controlling the heater, serve as outputs. By means of the regulating device, advantageously the air guide, in particular by means of ventilation, in the exhaust air recirculation device is to be adapted to the respectively prevailing relative air moisture of the exhaust air.

The invention is also directed to a method for operating a continuous-flow dryer for drying a material by means of hot air, wherein fresh air is supplied as supply air and exhaust air is removed and recirculated as supply air, and also fresh air on the one hand and exhaust air on the other hand are led through a heat exchanger, for transferring waste heat of the exhaust air into the fresh air. According to the invention, in this regard the removed exhaust air is supplied at the bottom into the heat exchanger in accordance with the above explanations.

BRIEF DESCRIPTION OF THE DRAWINGS

An exemplary embodiment of the solution according to the invention is explained in more detail below with the aid of the appended schematic drawings, in which.

DETAILED DESCRIPTION

Figure 1:
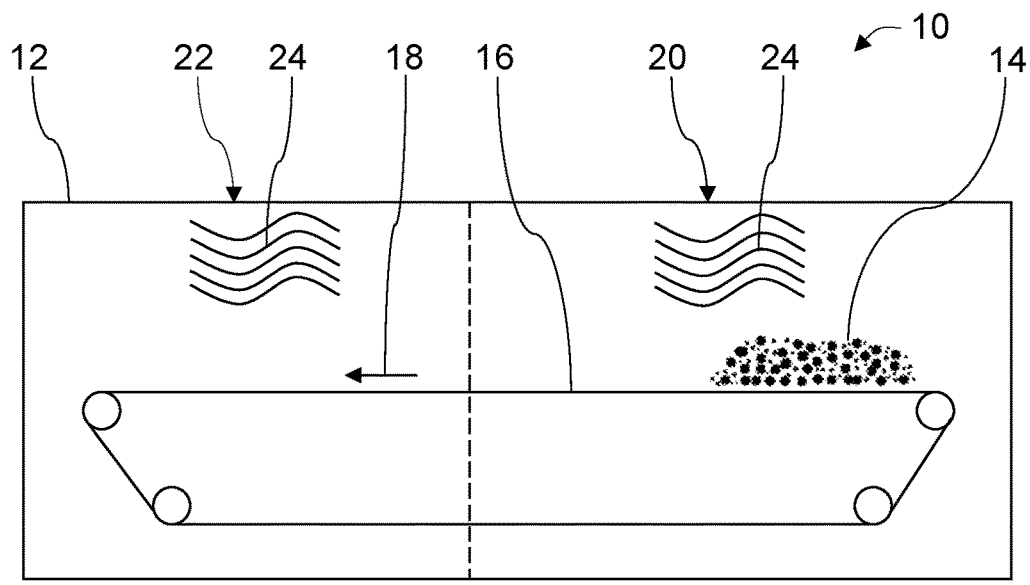
FIG. 1 shows a highly simplified longitudinal section of a continuous-flow dryer according to the prior art and FIG. 2 shows a highly simplified longitudinal section of a continuous-flow dryer according to the invention.
Figure 2:
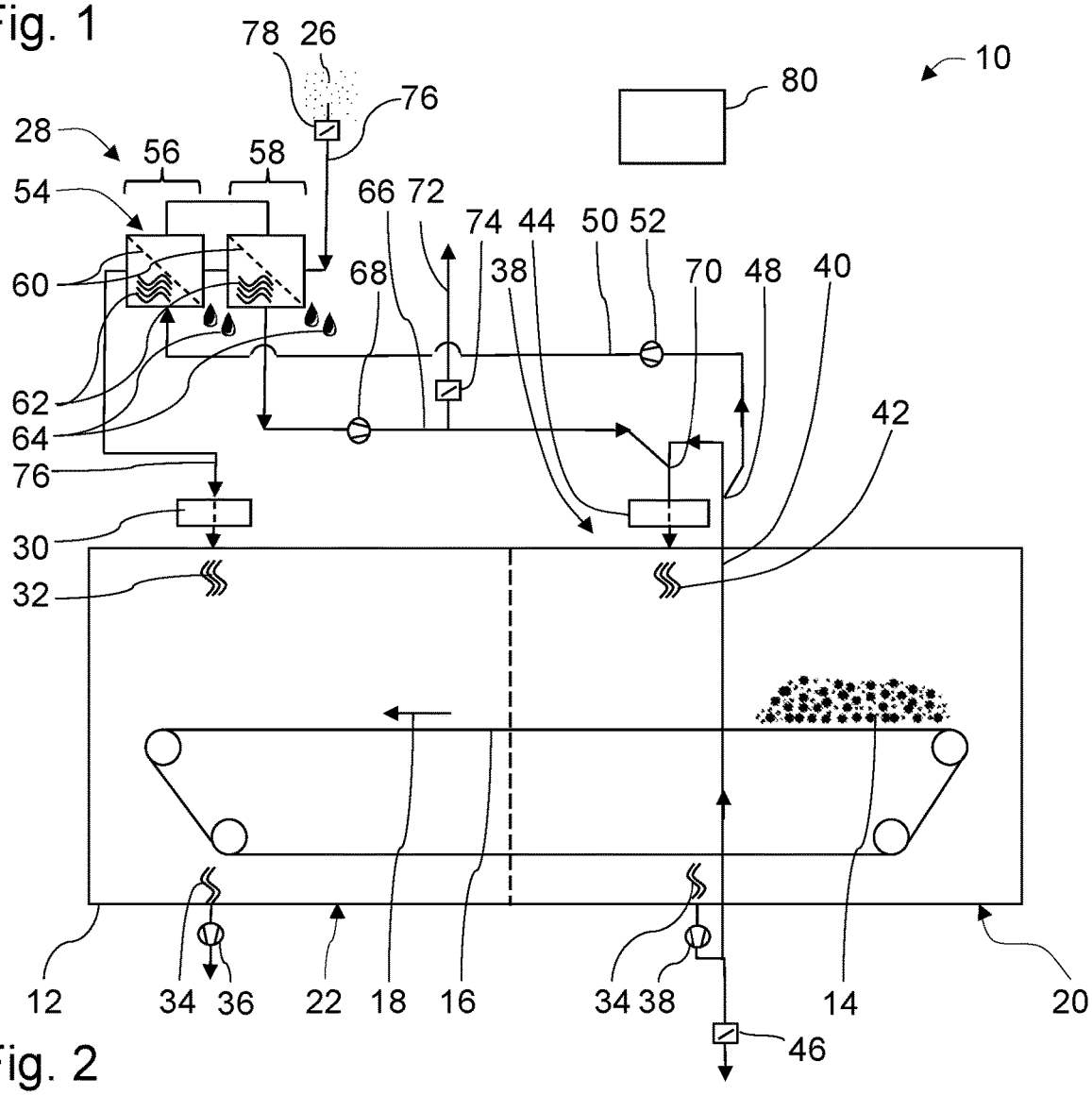

In FIGS. 1 and 2 there is each shown a continuous-flow dryer 10 in the form of a belt dryer. The continuous-flow dryer 10 has a housing 12, through which the initially moist or wet material 14 is to be transported by means of a belt 16 in a transport direction 18 through the continuous-flow dryer 10.

During transport, the material 14 passes firstly through a first section 20 and after that a second section 22. The two sections 20 and 22 divide the housing 12 spatially. In the transport direction they are largely separated from one another in terms of air flow, if necessary, by means of one dividing wall or a plurality of dividing walls. The sections 20 and 22 can also for their part be further subdivided into subsections.

Within the housing 12 there is hot air 24 which withdraws moisture (not shown) from the material 14 to be dried. With the withdrawing of moisture from the material 14, the material 14 becomes drier, it is dried.

FIG. 2 illustrates how such a material 14 is dried by means of hot air in the continuous-flow dryer 10, according to the invention, there. For drying, fresh air 26 flows from outside the housing 12, conveyed by a fresh air supply device 28, into the housing 12. The fresh air 26 flows through a first heater 30 which heats the fresh air 26 on its way through the heater 30. With the heating of the fresh air 26, the relative air moisture of the fresh air 26 decreases, the fresh air 26 becomes "drier".

This fresh air 26, after the heating, is referred to as the supply air 32. The supply air 32 flows into the section 22 and there flows around the individual particles of the material 14 or it flows through the layer of the material 14 on the belt 16. On this flowing around the particles of the material 14, the supply air 32 takes up moisture from the material 14. The relative air moisture of the supply air 32 increases, the supply air 32 becomes "more moist". The moistened supply air 32 is subsequently discharged from the housing 12 into surroundings thereof from the section 22 as exhaust air 34 by means of an exhaust air outlet 36 with a fan. This exhaust air 34 thus constitutes outgoing air.

Before the material 14 reaches the second section 22, it passes through the first section 20. In the section 20, exhaust air 34 is discharged at the bottom. This exhaust air 34 is led by means of an exhaust air recirculation device 38, which comprises in particular a fan, to a recirculation line 40. Through the recirculation line 40, this exhaust air 34 is largely recirculated again into the section 20 as supply air 42.

A flap 46 can be connected to the recirculation line 40, through which flap a part of the exhaust air 34 can be discharged directly into the surroundings of the continuous-flow dryer 10.

At the outlet of the recirculation line 40 there is arranged a heater 44, by means of which the recirculated exhaust air 34 can be heated up before its re-entry as supply air 42 into the section 20. The heater 44 may be, but does not necessarily have to be, provided. Alternatively, the heater 44 can also have a comparatively small heat capacity. The exhaust air 34 from the section 20 is thus largely recirculated directly as supply air 42 into the section 20 by means of the exhaust air recirculation device 38.

The recirculation line 40 further has a branch 48, to which a line 50 is connected. At the branch 48, a part of the exhaust air 34 is branched off from the recirculation line 40 and led out by means of the line 50. For this purpose, a sucking fan 52 to be separately regulated can be arranged in the line 50. The line 50 leads the branched-off exhaust air to a heat exchanger 54, and through it.

The heat exchanger 54 comprises two portions 56 and 58 which as such each constitute an independent heat exchanger and through which are to flow separately heat-supplying air and heat-discharging air.

The two portions 56 and 58 of the heat exchanger 54 each have a separating surface 60 at which, on one side, the branched-off exhaust air 34 is led out of the first section 20 as heat-supplying air and, on the other side, the fresh air 26 is led along as heat-discharging air. At each of the separating surfaces 60, heat therefore changes from the exhaust air 34 as waste heat 62 to the fresh air 26. At the same time, water 64 condenses out of the exhaust air 34 at the separating surface 60 with the cooling of the exhaust air 34.

The portion 56 forms the part, designated here as first portion, of the heat exchanger 54. At it the discharged exhaust air 34 is supplied by means of the line 50 downwards, in particular also at the bottom side from below. The exhaust air 34 then rises on flowing through the portion 56 from below upwards. At the same time the exhaust air 34 cools down at the associated separating surface 60 and the water 64 condensing there flows off along the separating surface 60 downwards. In so doing, this water 64 entrains dust particles from the exhaust air 34 with it, which would otherwise be deposited on the separating surface 60.

The exhaust air 34 flows upwards, in particular also at the top side upwards, out of the portion 56, is then diverted in a U-shape and then flows upwards, in particular also at the top side from above, into the portion 58 designated here as second portion 58. In the second portion 58 a condensation of water 64 does not necessarily occur. It is therefore more advantageous if the exhaust air 34 flows downwards and thus entrains at the same time those dust particles with it, which are contained in the exhaust air 34. These dust particles are thus discharged, together with the exhaust air 34, from the heat exchanger 54, without the latter being dirtied or sooted.

Subsequently, the exhaust air 34 then flows downwards, in particular also at the bottom side from below, out of the second portion 58 and flows off through a recirculation line 66. The recirculation line 66 leads the air, thus cooled and condensed out, as supply air 42 back into the first section 20. For this purpose, a sucking fan 68 to be separately regulated can be arranged in the recirculation line 66. The recirculation line 66 leads at a junction 70, in the flow direction after the branch 48, into the recirculation line 40.

In the flow direction shortly after the fan 68, a line 72 leading outwards into the surroundings of the continuous-flow dryer 10 branches off with a flap 74 arranged therein. This line 72 serves, with the associated flap 74, to discharge cooled exhaust air 34 from the recirculation line 66 into the surroundings. With such a discharge of a part of the exhaust air into the surroundings of the continuous-flow dryer 10, a slight negative pressure arises in the section 20. To equalize this negative pressure, air from the surroundings of the continuous-flow dryer 10 is forced into the first section 20 from outside. At the same time, no air and thus also no dust can escape to the outside from the section 20. This supply of air from outside into the section 20 therefore prevents a dusting of the surroundings of the continuous-flow dryer 10.

The fresh air 26 is led by means of a supply line 76 through the heat exchanger 54 and, as explained above, through the heater 30 into the second section 22. In so doing, the amount of supply air 32 thus supplied is controlled by means of a flap 78 which is arranged in the supply line 76 before the heat exchanger 54.

The fresh air 26 flows into the second portion 58 of the heat exchanger 54 firstly laterally, at the right side with respect to FIG. 2, at the associated side face of the heat exchanger 54. There, in the second portion 58 the exhaust air 34 is already comparatively highly cooled. The exhaust air 34 can, however, still transmit heat to the likewise comparatively cold fresh air 26.

The fresh air 26 thereafter flows out of the second portion 58 of the heat exchanger 54 at the opposite side face and passes over laterally into its first portion 56. In the first portion 56 the exhaust air 34 flowing through there is comparatively hot and can likewise advantageously emit further heat to the fresh air 26 already preheated in the second portion 58.

The fresh air 26 thus heated then flows out of the first portion 56 laterally at the left side with respect to FIG. 2 and is transported by means of the supply line 76 further to the heater 30.

The flaps and fans mentioned are controlled, and in particular regulated, altogether by means of a control 80, with various measuring devices and sensors (not shown) coupled to the control 76 being able to be provided.

LIST OF REFERENCE SYMBOLS 10 continuous-flow dryer
12 housing
14 material
16 belt
18 transport direction
20 section
22 section
24 hot air
26 fresh air
28 fresh air supply device
30 heater
32 supply air
34 exhaust air
36 exhaust air outlet
38 exhaust air recirculation device
40 recirculation line
42 supply air
44 heater
46 flap
48 branch
50 line
52 fan
54 heat exchanger
56 portion of the heat exchanger
58 portion of the heat exchanger
60 separating surface
62 waste heat
64 water
66 recirculation line
68 fan
70 junction
72 line
74 flap
76 supply line
78 flap
80 control

What is claimed is:

1. A continuous-flow dryer (10) for drying a material by means of hot air, comprising
a fresh air supply device (28) for supplying fresh air (26) as supply air (32),
an exhaust air recirculation device (38) for removing exhaust air (34) and for recirculating exhaust air as recirculated supply air (42), and
a heat exchanger (54), through which fresh air (26) on the one hand and exhaust air (34) on the other hand are led, for transferring waste heat of the exhaust air (34) into the fresh air (26), the heat exchanger (54) having
a first portion (56) through which the exhaust air (34) flows upwardly and
a second portion (58) through which the exhaust air (34) flows downwardly, the exhaust air being diverted in a U-shape between the first portion (56) and the second portion (58), and
a separating surface (60) arranged in the first portion (56) between the fresh air (26) and the exhaust air (34), the separating surface being configured to allow water (64) which condenses out of the exhaust air (34) to flow along the separating surface (60),
wherein the exhaust air (34) is supplied at a bottom of the first portion into the heat exchanger (54).

2. The continuous-flow dryer according to claim 1, wherein the exhaust air (34) is removed at a bottom of the second portion from the heat exchanger (54).

3. The continuous-flow dryer according to claim 1, wherein the exhaust air (34) first flows through the first portion (56) and subsequently through the second portion (58),
whereas the fresh air (26) first flows through the second portion (58) and subsequently through the first portion (56).

4. The continuous-flow dryer according to claim 1, wherein a first and a second section are provided, through which the material (14) is passed successively in a transport direction (18),
the fresh air supply device (28) being designed for supplying the fresh air (26) as the supply air into the first section, and
the exhaust air recirculation device (38) for removing the exhaust air (34) from the second section and for recirculating it as the recirculated supply air back into the second section.

5. The continuous-flow dryer according to claim 1, wherein a first and a second section (20, 22) are provided, through which the material (14) is passed successively in a transport direction (18),
the fresh air supply device (28) being designed for supplying the fresh air (26) as the supply air (32) into the second section (22), and
the exhaust air recirculation device (38) being designed for removing the exhaust air (34) from the first section (20) and for recirculating it as the recirculated supply air (42) back into the first section (20).

6. The continuous-flow dryer according to claim 1, wherein a heater (30) is provided, by means of which the fresh air (26) is to be heated up before being supplied as the supply air (32).

7. The continuous-flow dryer according to claim 1, wherein a heater (44) is provided, by means of which the exhaust air (34) led through the heat exchanger (54) is to be heated up before being supplied as the recirculated supply air (42).

8. A method for operating a continuous-flow dryer (10) for drying a material (14) by hot air (24), comprising:
supplying fresh air (26) as supply air (32);

removing exhaust air (34) and recirculating the exhaust air (34) as recirculated supply air (42);

leading the fresh air (26) and the exhaust air (34) through a heat exchanger (54), for transferring waste heat of the exhaust air (34) into the fresh air (26); and supplying the exhaust air (34) at a bottom into the heat exchanger (54), wherein leading the exhaust air (34) through the heat exchanger comprises

- leading the exhaust air upwardly through a first portion (56) of the heat exchanger (54),
- diverting the exhaust air in a U-shape from the first portion (56) of the heat exchanger (54) to a second portion (58) of the heat exchanger,
- leading the exhaust air downwardly through the second portion (58) of the heat exchanger, and
- allowing water to condense on a separating surface (60) arranged in the first portion (56) between the fresh air (26) and the exhaust air (34) and to flow along the separating surface (60).

* * * * *